June 16, 1925.
S. A. WILTSIE
1,542,753
METHOD OF WELDING ALUMINUM
Filed Nov. 11, 1922
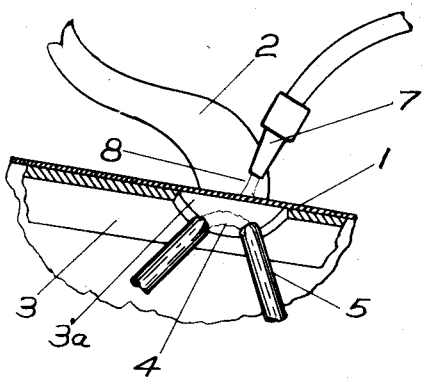
FIG.-1.
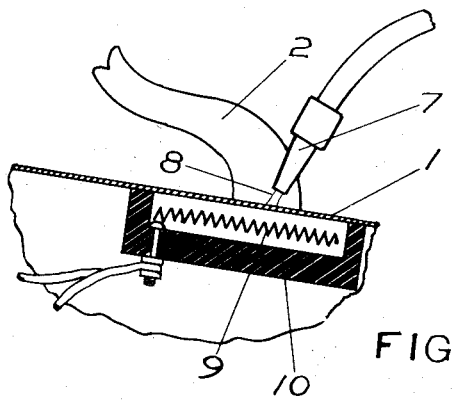
FIG.-2.
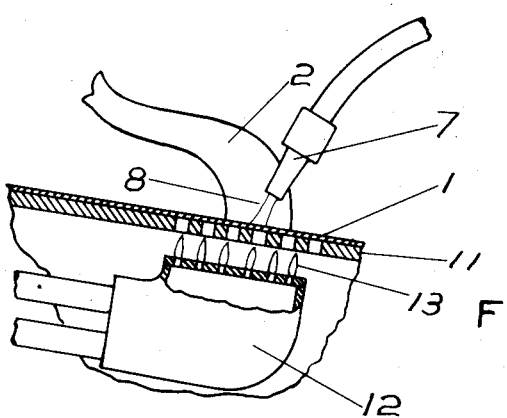
FIG.-3.
Inventor
Spencer A. Wiltsie
Attorney Patented June 16, 1925.

1,542,753

UNITED STATES PATENT OFFICE.

SPENCER A. WILTSIE, OF ERIE, PENNSYLVANIA, ASSIGNOR TO WELDA WARE PRODUCTS COMPANY, OF ERIE, PENNSYLVANIA, A CORPORATION OF PENNSYLVANIA.

METHOD OF WELDING ALUMINUM.

Application filed November 11, 1922. Serial No. 600,394.

*To all whom it may concern:*

Be it known that I, SPENCER A. WILTSIE, a citizen of the United States, residing at Erie, in the county of Erie and State of Pennsylvania, have invented new and useful Improvements in the Methods of Welding Aluminum, of which the following is a specification.

Aluminum has heretofore been welded. The usual practice has been to heat the body of metal to be welded to a temperature just below the welding temperature and then apply an acetylene torch to bring the metal to the welding point. The difficulty with this practice is that the preliminary heating softens the body of the aluminum and is thus objectionable. With my method I apply the preliminary heating locally. If it is a small weld the heat may extend over the entire weld and the metal is then brought up to the welding temperature by progressively heating the joint. If, however, the weld is extended over anything more than a local area I prefer to give to the metal a preliminary heat confined locally to the area of the weld and to advance the area of preliminary heating as the heat for welding is advanced along the joint. This may be accomplished by applying the preliminary heat to the opposite wall from that to which the welding heat is applied. In this way the areas of heat may be advanced together and a welding temperature may be brought about locally so rapidly as to preclude the extended diffusion of heat and thus the injurious softening of the metal may be prevented. To accomplish this with aluminum the manner of producing the preliminary heat at one side of the weld may be any convenient source such as an electric element, an electric arc, or a gas flame so long as the heat is controlled by spacing the arc or element to a temperature below that injurious to the aluminum. On the operating side of the weld, however, an acetylene torch or a source of heat that can be controlled must be used as the electric arc cannot be controlled directly at the metal to affect a weld of aluminum.

In the accompanying drawing I have illustrated the manner of practicing the process.

Fig. 1 illustrates the process using an arc as a medium for the preliminary heat.

Fig. 2 a view illustrating the utilization of an electric heating element for this purpose.

Fig. 3 illustrates a method of using a gas flame for this purpose.

1 marks one of the walls to be heated, and 2 the other wall. As shown this is the wall of an ordinary kettle, the wall 2 being the conventional spout. In the method used in Fig. 1 a support 3 is applied to the inner portion of the wall of the receptacle. This support has an opening 3ª which exposes the inner surface of the wall opposite the point of the weld. Electrodes 5 are arranged to produce an arc 4 in position to heat the wall in a local area directly at the weld. The arc found most satisfactory is produced by about one hundred ten or over volt current and the arc is maintained from one-half to three-fourths of an inch from the metal. The metal is given a preliminary heat by the arc of approximately eight hundred degrees Fahrenheit, this temperature giving to the surface a frosted appearance. An oxy-acetylene torch 7 producing a slightly carbonizing flame 8 is directed to the joint directly opposite the point heated by the arc. This intense flame brings the metal in a local area to the welding temperature and the weld is accomplished so rapidly as to preclude a wide expansion or diffusion of the heat incident to the weld and thus a minimum of injurious effect of the heat on the metal. As the work is advanced the arc is advanced to correspond to the advancing of the welding flame so that the metal heated in bringing about the weld is confined to a portion of the wall immediately adjacent to the weld. If care is taken this may be confined to a small fraction of an inch and, therefore, the walls of the finished article as a whole have their original quality.

In Fig. 2 I illustrate the method using a heating element 9. In this the insulating material 10 forms the support for the metal surrounding the weld. This is used ordinarily for small welds and while it may be advanced the preliminary heating where this is used may be so local as not to require it.

In Fig. 3 a support 11 is used. This is ordinarily in the form of a perforated plate. A gas burner 12 delivers a flame 13 against the supporting plate 11. Here if the weld is of any extent the gas flame giving the preliminary heat is added with the acetylene flame.

What I claim as new is:—

1. The method of welding aluminum which consists in heating the body of the metal locally adjacent to the weld from a source of heat delivered to one side of the material, and then raising the temperature of the metal thus preliminarily heated in a local area to a welding temperature with a gas flame directed to the weld from the side of the material opposite to that subjected to the preliminary heat whereby the temperature necessary for the weld and which is injurious to the metal is so rapidly applied at the weld as to prevent extended diffusion and injury to the metal away from the weld.

2. The method of welding aluminum which consists in heating the body of the metal locally adjacent to the weld from a source of heat delivered to one side of the material, then raising the temperature of the metal thus preliminarily heated in a local area to a welding temperature with a gas flame directed to the weld from the side of the material opposite to that subjected to the preliminary heat, and then advancing the areas of heat along the weld to advance the weld whereby the temperature necessary for the weld and which is injurious to the metal is so rapidly applied at the weld as to prevent extended diffusion and injury to the metal away from the weld.

3. The method of welding aluminum which consists in subjecting the body of the metal locally adjacent to the weld to a preliminary heat slightly below the welding temperature by means of an electric arc, and raising the metal with a gas flame in a small area after the preliminary heat to a welding heat, the arc being delivered to one side of the body of the metal and the welding heat to the opposing side.

4. The method of welding aluminum which consists in subjecting the body of the metal locally adjacent to the weld to a preliminary heat slightly below the welding temperature by means of an electric arc, and raising the metal with a gas flame in a small area after the preliminary heat to a welding heat, the arc being delivered to one side of the body of the metal and the welding heat to the opposing side, said heating areas being advanced to extend the weld.

In testimony whereof I have hereunto set my hand.

SPENCER A. WILTSIE.